(12) United States Patent
Bayer et al.

(10) Patent No.: US 8,623,128 B2
(45) Date of Patent: Jan. 7, 2014

(54) ADDITIVES COMPRISING CELLULOSE ETHERS FOR CERAMICS EXTRUSION

(71) Applicants: Roland Bayer, Walsrode (DE); Matthias Knarr, Walsrode (DE)

(72) Inventors: Roland Bayer, Walsrode (DE); Matthias Knarr, Walsrode (DE)

(73) Assignee: Dow Wolff Cellulosics GMBH Co, Midland, MI (US)

( * ) Notice: Subject to any disclaimer, the term of this patent is extended or adjusted under 35 U.S.C. 154(b) by 0 days.

(21) Appl. No.: 13/688,660

(22) Filed: Nov. 29, 2012

(65) Prior Publication Data

US 2013/0090235 A1   Apr. 11, 2013

Related U.S. Application Data

(62) Division of application No. 12/520,590, filed as application No. PCT/EP2007/010271 on Nov. 27, 2007, now Pat. No. 8,354,055.

(30) Foreign Application Priority Data

Dec. 22, 2006  (DE) .......................... 10 2006 062 140

(51) Int. Cl.
  *C04B 35/636*  (2006.01)
  *C04B 35/80*  (2006.01)
(52) U.S. Cl.
  CPC ............. *C04B 35/6365* (2013.01); *C04B 35/80* (2013.01); *C04B 2235/945* (2013.01)
  USPC ................ 106/172.1; 106/162.5; 106/197.01; 106/198.1; 106/199.1
(58) Field of Classification Search
  USPC .................................. 106/162.5, 198.1, 199.1
  See application file for complete search history.

(56) References Cited

U.S. PATENT DOCUMENTS

| 5,618,800 | A  | * | 4/1997  | Kabra et al. ..................... 514/57 |
| 5,925,308 | A  | * | 7/1999  | Fewkes et al. ................ 264/623 |
| 6,214,204 | B1 |   | 4/2001  | Gradkaree et al. |
| 6,368,992 | B1 | * | 4/2002  | Beall et al. ...................... 501/94 |
| 6,593,468 | B1 |   | 7/2003  | Lange et al. |
| 6,677,261 | B1 |   | 1/2004  | Addlego et al. |
| 7,041,168 | B2 |   | 5/2006  | Schlesiger et al. |
| 7,491,755 | B2 |   | 2/2009  | Bayer et al. |
| 2002/0011683 | A1 |   | 1/2002  | Gradkaree et al. |
| 2003/0151174 | A1 |   | 8/2003  | Makino et al. |
| 2005/0080167 | A1 |   | 4/2005  | Bayer et al. |
| 2006/0292393 | A1 |   | 12/2006 | Kunieda et al. |
| 2007/0090577 | A1 | * | 4/2007  | Chou ........................... 264/638 |
| 2009/0233789 | A1 |   | 9/2009  | Godkaree et al. |

FOREIGN PATENT DOCUMENTS

| EP | 0776696 B1 | 9/2001 |
| JP | 2002-037673 | 2/2002 |

OTHER PUBLICATIONS

Methocel Brochure, Methocel Cellulose Ethers Binders and Processing Aids for Ceramics, Dow Chemical Co., Mar. 1996.*
Cancer Chemotherapy to Ceramic Colorants, Ullmann's Encyclopedia of Industrial Chemistry, 1986, pp. 468-473, vol. A5, VCH.
Extrusion and Plastic Deformation Forming, Chapter 23, pp. 451-473.
Engelskirchen, Polysaccharide derivatives, Macromolecular Materials, vol. E20, Georg Thieme Publishers, Stuttgart, New York.

* cited by examiner

*Primary Examiner* — David M Brunsman

(57) ABSTRACT

The present invention relates to extrudable ceramic masses and other masses which set as a result of baking or sintering, which masses comprise specific additives based on water-soluble cellulose ethers, an extrusion process, the extrudates and their use.

10 Claims, No Drawings

ADDITIVES COMPRISING CELLULOSE ETHERS FOR CERAMICS EXTRUSION

CROSS REFERENCE TO RELATED APPLICATIONS

This application is a divisional of U.S. Ser. No. 12/520,590, filed Jun. 22, 2009, which was a 35 USC §371 national phase filing of PCT/EP2007/010271 filed Nov. 27, 2007, which claims the benefit of Application No. DE 10 2006 062 140.9, filed Dec. 22, 2006.

The present invention relates to extrudable ceramic masses and other masses which set as a result of baking or sintering, which masses comprise specific additives based on water-soluble cellulose ethers, an extrusion process, the extrudates and their use.

Water-soluble cellulose ethers have been used for many years as water retention agents, plasticizers and lubricants in the extrusion of ceramic masses and other masses which set as a result of baking or sintering to produce honeycomb bodies or other complicated profiles having similarly fine structures (see, for example: James S. Reed, Principles of Ceramics Processing, John Wiley & Sons, 1995, Chapter 23: Extrusion and Plastic Deformation Forming, p. 450 ff.)

The extrusion of ceramic masses and other masses which set as a result of baking or sintering is carried out by pressing a plastic mass through a die orifice to produce any desired profiles, preferably honeycomb profiles as are used in catalysts or diesel soot particle filters. These masses can have various makeups and basically comprise a material, in particular a ceramic material, which is sinterable or hardens as a result of a ceramic baking process. It can further comprise catalytically active materials, fibers, aggregates and lightweight aggregates.

Technical and economic disadvantages of the usually extruded ceramic masses and other masses which set as a result of baking or sintering are high extrusion pressures which make operation of the extruders prematurely uneconomical due to high wear or high power costs. Another disadvantage is an unsatisfactorily low extrusion rate which reduces the capacity of the entire plant. The mass should undergo very little heating as a result of internal friction, since the consumption of cooling water or electric cooling likewise impairs the economics. The mass should be able to be extruded without cracks and form no cracks after drying of the extruded profile in air and subsequent baking or sintering. The cohesion of the particles in the extruded mass should be so high that even thin webs should be able to be extruded without problems. The shrinkage on drying and the shrinkage after baking should be minimal and virtually no crack formation should take place.

Rheological Measurement Methods are Employed, Inter Alia, to Characterize Water-Soluble Cellulose Ethers:

EP 1 025 130 B1 claims largely fiber-free cellulose ethers which in purely aqueous solution in concentrations of 0.5% by weight display values of the loss factor (tan $\delta$) of less than 1 at an angular frequency of 1 Hz. These are claimed as auxiliaries for applications in the cosmetics, pharmaceutical and food sectors and for the production of paints (emulsion paints and silicate paints) and also in civil engineering. Use in the extrusion of ceramic or other sinterable masses is not described.

EP 1506979 describes a cellulose ether composition as additive for the extrusion of mineral masses. The extent to which cellulose ethers prove to be advantageous in the extrusion of ceramics or other sinterable materials is not disclosed.

It has now surprisingly been found that particular water-soluble cellulose ethers are suitable for overcoming the abovementioned disadvantages in the extrusion of ceramic masses and other masses which set as a result of baking or sintering.

The invention therefore provides ceramic masses and other masses which set as a result of baking or sintering which comprise water-soluble cellulose ethers, wherein these water-soluble cellulose ethers are characterized in that an alkaline solution of 1.0 part by weight of these cellulose ethers per 100 parts by weight of solution displays elastic properties in which the ratio of loss modulus G" to storage modulus G' (tan $\delta$=G"/G') of the solution at a temperature of 20° C.+/−1° C. when using a solvent comprising 98 parts by weight of water and 2 parts by weight of sodium hydroxide per 100 parts by weight of solvent in a rheological oscillation experiment as a function of the angular frequency $\omega$ in the linear viscoelastic region at angular frequencies of less than or equal to 100 rad/s has a value of less than 1.3.

Preference is given to cellulose ethers of the abovementioned type whose solutions as described above have a tan $\delta$=G"/G' of less than or equal to 1.2, particularly preferably less than or equal to 1.1 and very particularly preferably <1.0, at angular frequencies of less than or equal to 100 rad/s.

The masses of the invention preferably comprise cellulose ethers of the abovementioned type which are simultaneously characterized in that an alkaline solution of 1.5 parts by weight of the cellulose ethers per 100 parts by weight of solution has a capillary breakup time in an extensional flow experiment at a temperature of 20° C.+/−1° C. when using a solvent comprising 98 parts by weight of water and 2 parts by weight of sodium hydroxide per 100 parts by weight of solvent of 2.0 or more seconds.

Extensional flow experiments to determine the capillary breakup time are known per se to those skilled in the art. For the purposes of the present invention, the figures for the capillary breakup time are based on measurements using a Haake Capillary Breakup Extensional Rheometer (CaBER 1) from Thermo Fischer, Karlsruhe, Germany. In the measurement, a liquid sample is introduced between two smooth concentric plates between which the liquid forms a "liquid bridge". During the measurement, the upper plate moves upward from the starting position (plate spacing 3 mm) to a plate spacing of 9 mm in 25 milliseconds and is then fixed in this position.

The sudden extension forms an unstable liquid capillary between the two plates. After extension is complete (plate spacing: 9 mm), the middle of the liquid capillary is subject to an extension which is determined by the extension properties of the sample. The decrease in the diameter in the middle of the liquid capillary is monitored as a function of time by means of a laser micrometer. To obtain reproducible measured values, the capillary breakup time is defined as the time interval from the end of the moving apart of the plates to the point in time at which the liquid capillary has a diameter of only 0.1 mm. The capillary breakup times reported were obtained by forming the mean of five individual measurements.

Preference is given to cellulose ethers of the abovementioned type whose solutions as described above have a capillary breakup time of greater than 2.5 seconds, particularly preferably greater than 3.0 seconds.

For the purposes of the present invention, ceramic masses and other masses which set as a result of baking or sintering are all masses which comprise at least one of the components listed below which can be baked or sintered by baking or sintering alone or with addition of other sintering aids:

alumina, aluminum nitride and aluminum carbide, kaolin, cordierite, mullite, silicon carbide, silicon boride, silicon nitride, titanium dioxide, titanium carbide, boron carbide, boron oxide, silicates and sheet silicates such as clay, bentonites, talc, silicon metal, carbon as carbon black or graphite, ground glass, rare earth oxides and other metal oxides, zeolites and related substances.

The term "ceramic masses and other masses which set as a result of baking or sintering" does not include hydraulic binders such as cement or gypsum and masses based on cement or gypsum. These hydraulic binders set as a result of incorporation of water into the crystal lattice.

According to the invention, cellulose ethers having the abovementioned properties are to be used. These can be water-soluble cellulose ethers such as ionic cellulose ethers such as sulfoethylcellulose or carboxymethylcellulose and salts thereof, or nonionic cellulose ethers such as alkylcelluloses, hydroxyalkylalkylcelluloses or hydroxyalkylcelluloses, in particular methylcellulose, methylhydroxyethylcellulose, methylhydroxypropylcellulose, hydroxyethylcellulose, ethylhydroxyethylcellulose, methylethylhydroxyethylcellulose, methylhydroxyethylhydroxypropylcellulose, methylhydroxyethylhydroxybutylcellulose or cellulose ethers which at the same time comprise methyl groups and longer-chain hydrophobic side chains and also mixtures of the abovementioned products.

Such cellulose ethers can easily be prepared by etherification of commercially available celluloses. An overview of the chemical fundamentals and principles in the preparation (preparative processes and process steps) and a materials composition and description of the properties and uses of the various derivatives is given in, for example, Houben-Weyl, Methoden der Organischen Chemie, Makromolekulare Stoffe, 4th edition, Volume E 20, p. 2042, Thieme Verlag, Stuttgart (1987) and Ullmann's encyclopedia of industrial chemistry, Verlag Chemie, Weinheim/New York, (5.) A 5, p. 468.

The cellulose ethers to be used for the purposes of the invention can be selected from among the cellulose ethers mentioned without problems and without the need to be inventive with the aid of the parameters such as tan δ and capillary breakup time which are relevant to the invention and can easily be determined by a person skilled in the art by means of routine experiments. The corresponding parameters for the synthesis of the cellulose ethers used are described in the examples.

Further additives such as hydrophobicizing agents, redispersion powders, superabsorbents based on crosslinked acrylates and polysaccharides, plasticizers, gelatins, lubricants (for example polyethylene oxide homopolymers, copolymers and terpolymers), surfactants, defoamer, waxes, oils, fatty acids and esters thereof, polymers based on acids, salts, amides and esters of acrylic acids and methacrylic acids, polysaccharides such as natural or modified starches, xanthans, glucans, welans, guar, dextran, chitin, chitosan, xylan, gellan, mannan, galactan, arabinoxylan, alginates and related polysaccharides, polyvinyl alcohols including derivatives thereof and polymers based on urethanes can be added to the cellulose ethers.

Fibers which leave behind pores after baking or remain in the extrudate and increase the flexural strength can also be added to the masses of the invention.

For the present purposes, fibers are all types of natural or synthetic fibers such as fibers based on cellulose, bamboo, coconut, polyethylene, polypropylene, polyamide, polyacrylonitrile, carbon, glass, ceramic and other mineral fibers. Their fiber lengths and thicknesses can be varied within wide ranges.

The invention further provides a process for the extrusion of ceramic masses or other masses which set as a result of baking or sintering, which comprises mixing a ceramic mass or other mass which sets as a result of baking or sintering with at least one cellulose ether to be used according to the invention and subsequently extruding it.

The invention likewise provides the extrudates which can be obtained by the process of the invention, shaped bodies which can be obtained therefrom by thermal treatment and their use as honeycomb bodies for exhaust gas purification or as catalyst.

EXAMPLES

Preparation of the Cellulose Ethers:

The cellulose ethers used were prepared as described in Houben-Weyl, Methoden der Organischen Chemie, Makromolekulare Stoffe, 4th edition, Volume E 20, p. 2042 Thieme Verlag, Stuttgart (1987).

245 g on a dry basis of cotton linters cellulose or wood pulp having a limiting viscosity indicated in the table below were placed in a 5 liter autoclave and made inert by evacuation and introduction of nitrogen. The precise reaction conditions were matched to the substitution pattern desired in each case. 257 g of dimethyl ether, 3.5-5 eq. of methyl chloride and 3-4 eq. of 50% strength by weight aqueous sodium hydroxide solution were added via an injection line while stirring. The mixture was made alkaline at 25° C. over a period of 60 minutes while stirring. 0.45 eq. of ethylene oxide or 0.55 eq. of propylene oxide were subsequently added, the reactor was heated to 85° C. over a period of 30 minutes and etherification was carried out at 85° C. for from 120 to 240 minutes, the reactor was subsequently cooled and the volatile constituents were taken off by evacuation. The crude product was washed twice with hot water, subsequently dried and milled.

Celluloses used were wood pulp and/or linters characterized by the following limiting viscosities. The limiting viscosity was determined in accordance with ISO 5351-1 (1981).

| Sample | Cellulose ether | Limiting viscosity [ml/g] |
| --- | --- | --- |
| 1 | Methylhydroxyethylcellulose | 800-1000 |
| 2 | Methylhydroxypropylcellulose | 1100-1300 |
| 3 | Methylhydroxyethylcellulose | 1200-1500 |
| 4 | Methylhydroxyethylcellulose | 1500-1700 |
| 5 | Methylhydroxyethylcellulose | 1600-1900 |
| 6 | Methylhydroxyethylcellulose | 1800-2200 |

Procedure for Rheological Experiments:

The rheological characterization of the cellulose ethers described was carried out on the basis of the respective cellulose ether as solid taking account of residual salt contents and residual moisture contents.

To describe the viscoelastic behavior, the storage modulus G' and the loss modulus G" or the loss factor tan δ, respectively, as the ratio G"/G' were in each case determined as a function of the angular frequency ω in a rheological oscillation experiment. The storage modulus G' corresponds to the deformation energy which is completely available after the stress is removed. The storage modulus G' indicates the elastic behavior of the sample. The loss modulus G", on the other hand, is a measure of the deformation energy consumed during the shearing process in the sample and thus represents the viscous behavior.

G' and G" were determined by means of measurements in oscillating shear flow at low amplitude (deformation γ<5%) and variable angular frequency. At small deformations (amplitudes), the material functions measured are independent of the magnitude of the deformation and thus dependent only on the angular frequency employed.

As measurement solutions for the determination of tan δ, the cellulose ethers were measured in a concentration of 1.0 part by weight per 100 parts by weight of a solvent comprising 98 parts by weight of water and 2 parts by weight of sodium hydroxide per 100 parts by weight of solvent and at a temperature of 20° C. in a rheological oscillation experiment in the linear viscoelastic range.

The measurements were carried out at 20° C. using a Haake rotational rheometer RS 600 from Thermo Fischer, Karlsruhe, Germany, having a cone-plate geometry (C60/2°) and a Physica MCR 501 (Anton Paar, Ostfildem, Germany) having a cone-plate geometry (CP50/1°). Here, the sample was conditioned in the measurement gap employed for 180 seconds before the actual measurement.

The extensional flow experiments necessary to determine the capillary breakup time are based on measurements using a Haake Capillary Breakup Extensional Rheometer (CaBER 1) from Thermo Fischer, Karlsruhe, Germany. In the measurement, a liquid sample was introduced between two smooth, concentric plates between which the liquid formed a "liquid bridge". During the measurement, the upper plate moved upward from the starting position (plate spacing: 3 mm) over a period of 25 milliseconds to a plate spacing of 9 mm and was then fixed at this position. The capillary breakup time is the time until the liquid capillary formed on extension breaks again.

Solutions of 1.5 parts by weight of the cellulose ether per 100 parts by weight of a solvent comprising 98 parts by weight of water and 2 parts by weight of sodium hydroxide per 100 parts by weight of solvent were used for these studies. A cushioned strike profile was used for this extension profile. The measurement of the decrease in the diameter of the liquid capillary was carried out in the real time mode at a sampling frequency of 1000 Hz. All measurements were carried out at a temperature of 20° C.

Procedure for the Extrusion Experiments

The dry components were firstly premixed dry, then admixed with water and mixed again. They were subsequently kneaded, compacted in a single-screw extruder and extruded through a die orifice:

35 parts by weight of silicon carbide SiC Dunkel Mikro F 280 (manufactured by ESK-SiC GmbH, Frechen, Germany), 35 parts by weight of silicon carbide Sic Dunkel Mikro F 360 (manufactured by ESK-SiC GmbH, Frechen, Germany), 30 parts by weight of silicon carbide SiC SM 10 (manufactured by ESK-SiC GmbH, Frechen, Germany) and 4 parts by weight of cellulose ether were firstly mixed dry in a fluidized-bed mixer (manufactured by Lödige, Germany) until homogeneous, water at 20° C. was subsequently added, the mass was mixed further and kneaded in a kneader (manufactured by AMK, Aachen, Germany) for a few minutes. The mass was then immediately introduced into the feed trough of a single-screw extruder maintained at 20° C. (Händle 8D, screw diameter 8 cm, from Händle, Mühlacker, Germany). In this, the mass was extruded through a perforated plate and passed through the vacuum chamber for degassing. It was then firstly strained (i.e. pressed through a screen having a mesh opening of 0.4 or 0.2 mm in order to separate off aggregates) and subsequently extruded through a honeycomb die orifice (for details see below) and discharged onto a conveyor belt. To be able to see differences between cellulose ethers which lubricate well and lubricate poorly, the cooling was switched off on the extruder after commencement of the experiment and the heating of the mass during the experiment was measured.

All masses extruded in this way were set to a customary consistency (Shore hardness=10.0-11.5) by means of a water to solids ratio (W/S ratio) based on their water requirement. The consistency is a measure of the stiffness of the mass.

Cellulose Ethers Used:

| Sample | Cellulose ether | tan δ at 100 rad/s | Capillary breakup time |
|---|---|---|---|
| 1 | Methylhydroxyethylcellulose | 3.6 | 0.7 s |
| 2 | Methylhydroxypropylcellulose | 1.2 | 2.0 s |
| 3 | Methylhydroxyethylcellulose | 1.2 | 2.1 s |
| 4 | Methylhydroxyethylcellulose | 0.8 | 3.6 s |
| 5 | Methylhydroxyethylcellulose | 0.9 | 4.3 s |
| 6 | Methylhydroxyethylcellulose | 0.7 | 4.4 s |

| Ex. | Cellulose ether | W/S | Current drawn | Pressure at 200 cpsi (bar) | Pressure at 300 cpsi (bar) | Heating of the composition |
|---|---|---|---|---|---|---|
| A | 6 | 0.165 | 1.88 | 42 | 50 | <10° C. |
| B | 5 | 0.165 | 1.89 | 47 | 55 | <10° C. |
| C | 4 | 0.165 | 1.91 | 51 | 58 | <10° C. |
| D | 3 | 0.165 | 1.96 | 53 | 61 | >10° C. |
| E | 2 | 0.165 | 1.96 | 58 | >62 | >10° C. |
| F | 1 | 0.165 | Not strainable | n.e. | n.e. | >10° C. |
| G | 1 | 0.21 | 3.52 | n.e. | n.e. | >10° C. |

Abbreviations: n.e.: not extrudable

The parts by weight of the cellulose ethers are based on 100 parts of silicon carbide (dry).

W/S is the water/solids factor. The amount of water used is calculated only on the basis of silicon carbide.

The current drawn during straining (=pressing of the mass through a metal screen having a mesh opening of 0.4 mm to remove any agglomerates) is an indicator of the flowability of the mass and at the same time also of the economics. Currents drawn of 2 bar and above are a serious danger to bearings, motor and shaft of the extruder (extruder 8D from Händle, Mühlacker, Germany).

Pressure is the pressure measured just before the mass passes through the honeycomb die orifice. A 200 cpsi die (web thickness=0.30 mm) and a 300 cpsi die (web thickness=0.26 mm) (cpsi is the number of cells per square inch) were used.

The temperature of the strained and extruded masses was measured by means of a noncontact infrared thermometer after leaving the die orifice; these temperatures coincided with those measured via the temperature sensor built into the die head.

Experimental Results:

Examples A to C using cellulose ethers 6, 5 and 4 according to the invention having tan δ<1 and a capillary breakup time >3 seconds in each case could be extruded without difficulty. Currents drawn by the extruder, extrusion pressure and heating of the mass were in a tolerable range. As examples D and E using cellulose ethers 3 and 2 show, the use of cellulose ethers having a tan δ and capillary breakup time outside the range according to the invention does not lead to a process which functions well in technical terms, since the heating of the mass in an uncooled extruder exceeds the critical figure of 10° C. In addition, the current drawn gets too close to the critical value of 2 A. At the same time, a pressure of 60 bar is exceeded during extrusion through a 300 cpsi die.

The mass in example F could not be strained at a W/S of 0.165; the addition of further water (to a W/S of 0.21, cf. example G) also did not lead to the necessary plasticization, so that the experiment had to be stopped after a current increase to 3.52 A for the main screw.

The invention claimed is:

1. A ceramic mass which sets as a result of baking or sintering, wherein the mass comprises:
    a water-soluble cellulose ether which is characterized by elastic properties in which the ratio of loss modulus G" to storage modulus G' (tan δ=G"/G') of the solution has a value of less than 1.3, wherein the tan δ is measured in an alkaline solution of 1.0 part by weight of the water-soluble cellulose ether per 100 parts by weight of solution at a temperature of 20° C. +/−1° C. when using a solvent comprising 98 parts by weight of water and 2 parts by weight of sodium hydroxide per 100 parts by weight of solvent in a rheological oscillation experiment as a function of the angular frequency ω in the linear viscoelastic region at angular frequencies of less than or equal to 100 rad/s; and
    at least one compound selected from the group consisting of alumina, aluminum nitride and aluminum carbide, cordierite, mullite, silicon carbide, silicon boride, silicon nitride, titanium dioxide, titanium carbide, boron carbide, boron oxide, talc, silicon metal, carbon black, graphite, rare earth oxides, and zeolites.

2. The ceramic mass of claim 1, wherein the water-soluble cellulose ether is characterized by a capillary breakup time of 2.0 or more seconds, measured as a solution of 1.5 parts by weight of the water-soluble cellulose ether per 100 parts by weight of solution in an extensional flow experiment at a temperature of 20° C. +/−1° C. when using a solvent comprising 98 parts by weight of water and 2 parts by weight of sodium hydroxide per 100 parts by weight of solvent.

3. The ceramic mass of claim 1, additionally comprising fibers selected from cellulose, bamboo, coconut, polyethylene, polypropylene, polyamide, polyacrylonitrile, carbon, glass, ceramic or mineral fibers.

4. The ceramic mass of claim 2, additionally comprising fibers selected from cellulose, bamboo, coconut, polyethylene, polypropylene, polyamide, polyacrylonitrile, carbon, glass, ceramic or mineral fibers.

5. The ceramic mass of claim 1, wherein the mass exhibits sufficiently low internal friction to exhibit a temperature rise of less than about 10 C during extrusion.

6. The ceramic mass of claim 1, wherein the mass does not crack during extrusion.

7. The ceramic mass of claim 1, wherein the mass does not crack after drying or during baking or sintering.

8. The ceramic mass of claim 1, wherein the cohesion of the particles in the extruded mass is sufficiently high to allow extrusion of a web having a web thickness less than about 0.30 mm.

9. The ceramic mass of claim 1, wherein the mass is honeycomb body for exhaust gas purification.

10. The ceramic mass of claim 1, wherein the mass is honeycomb body for a catalyst.

* * * * *